United States Patent
Shin

(10) Patent No.: US 7,497,687 B2
(45) Date of Patent: Mar. 3, 2009

(54) DISPLAY DEVICE OF BRAILLE POINTS

(76) Inventor: Hyun-Oh Shin, D-101 Kumok-Villa, 158-7 Kumok-Dong, Namyangju-Si, Kyungki-Do 472-804 (KR)

( * ) Notice: Subject to any disclaimer, the term of this patent is extended or adjusted under 35 U.S.C. 154(b) by 517 days.

(21) Appl. No.: 10/595,325

(22) PCT Filed: Oct. 5, 2004

(86) PCT No.: PCT/KR2004/002542

§ 371 (c)(1), (2), (4) Date: Apr. 7, 2006

(87) PCT Pub. No.: WO2005/036377

PCT Pub. Date: Apr. 21, 2005

(65) Prior Publication Data

US 2008/0171308 A1    Jul. 17, 2008

(30) Foreign Application Priority Data

Oct. 10, 2003   (KR) ...................... 10-2003-0070681

(51) Int. Cl.
   *G09B 21/00*   (2006.01)
(52) U.S. Cl. ...................................... 434/114; 434/113
(58) Field of Classification Search ................. 434/112, 434/113, 114, 115; 345/31, 108; 340/407.1, 340/407.2
See application file for complete search history.

(56) References Cited

U.S. PATENT DOCUMENTS

| | | | | |
|---|---|---|---|---|
| 3,987,438 A | * | 10/1976 | Lindenmueller et al. | . 340/407.1 |
| 4,871,992 A | * | 10/1989 | Petersen | ................... 340/407.1 |
| 5,772,440 A | * | 6/1998 | Ida | .............................. 434/114 |
| 6,109,922 A | * | 8/2000 | Litschel et al. | ............... 434/114 |
| 6,217,338 B1 | * | 4/2001 | Tieman | ........................ 434/114 |
| 6,354,839 B1 | * | 3/2002 | Schmidt et al. | ............. 434/113 |
| 6,700,553 B2 | * | 3/2004 | Becker et al. | .................. 345/31 |
| 6,743,021 B2 | * | 6/2004 | Prince et al. | ................. 434/113 |
| 7,018,209 B2 | * | 3/2006 | Schleppenbach et al. | ..... 434/114 |
| 7,097,457 B2 | * | 8/2006 | Kajino et al. | ................ 434/112 |

FOREIGN PATENT DOCUMENTS

| | | |
|---|---|---|
| JP | 54-106191 | 8/1979 |
| JP | 09-156848 | 6/1997 |
| KR | 1020000038125 | 7/2000 |

* cited by examiner

*Primary Examiner*—Kurt Fernstrom
(74) *Attorney, Agent, or Firm*—IPLA P.A.; James E. Bame

(57) ABSTRACT

The present invention relates to a display device of braille points. In the device, a coating layer 40 is formed on the upper surface of a receiving holes 120, a recognition stick 130 is installed in the hole 120 and has a metal plate 130, a guide axis 150 is installed below a base part 110, a header part 180 which has a supporting part 170 having a number of pins 160 therein is installed on the guide axis 50, and a magnetic body 90 is attached to a side of the supporting part 170.

5 Claims, 5 Drawing Sheets

DISPLAY DEVICE OF BRAILLE POINTS

TECHNICAL FIELD

The present invention relates to a display device of braille points and in particular, relates to a display device of braille points which has simple structure and can be easily fabricated and installed, and represents a raised letters easily by installing a recognition stick in receiving hole to be moved upwardly and downwardly, installing a header part having a number of electronic pins on a guide axis below the receiving hole and intruding the stick selectively.

BACKGROUND ART

A conventional a display device of braille points is described in Korean laid-open No. 2000-0038125.

As shown in FIG. 1 and FIG. 2, in the display device of braille points, a number of receiving holes 12 are formed on the upper surface of a base body 10, a braille stick 20 is installed in the hole 12 to move upward and downward, an electromagnet 30 having coils is installed in the upper end of the hole 20 in order to protrude the upper end of the stick by using electromagnetic force, a current is supplied to the coils 34 of the electromagnet 30 through a power supply 50, and a cover 40 is installed on the upper surface of the base body 10.

As the braille stick 20 is installed in the hole 12 to move upward and downward, the electromagnet 30 having coils is installed in the upper end of the hole 20 and connected to the power supply 50, the cover 40 is fixed on the upper surface of the base body 10, and the stick 20 can be pulled up or down by using the electromagnetic force from the electromagnet 30 to represent various information as a raised letters, it is possible to provide information to a blind person by using a computer.

However, as the electromagnet 30 having coils 34 is installed on the upper end of the receiving hole 12, the structure of the device is complicated. Therefore, the fabrication and installation of the device is considerably difficult. In particular, when the electromagnet 30 is operated by an electric signal from the power supply 50, a noise would be occurred between the electromagnet and an adjacent electromagnet. Thus, miss-operation of the stick can be occurred.

DISCLOSURE OF THE INVENTION

Therefore, the present invention is devised to overcome above problems. An object of the present invention is to provide a display device of braille points which has simple structure and can be easily fabricated and installed, and represents a raised letters easily by installing a recognition stick in receiving hole to be moved upwardly and downwardly, installing a header part having a number of electronic pins on a guide axis below the receiving hole and intruding the stick selectively.

BRIEF DESCRIPTION OF THE DRAWINGS

The above objects, other features and advantages of the present invention will become more apparent by describing the preferred embodiment thereof with reference to the accompanying drawings, in which.

BEST MODE FOR CARRYING OUT THE INVENTION

In order to achieve the above objects, the present invention is constructed such that a display device of braille points in which a number of receiving holes are formed on the upper surface of a base part with a regular interval, a number of recognition sticks for the display device are installed respectively in the holes to be moved upwardly and downwardly, said stick being selectively protruded in the hole of the base part, comprising:

a base part in which a number of receiving holes are formed on the upper surface and a coating layer is formed on the upper surface;

a number of recognition sticks installed respectively in the holes to be moved upwardly and downwardly and having a metal plate attached to the lower end of the stick;

a guide axis is installed below the base part having the holes to move the stick upwardly and downwardly, and a header part installed on the guide axis to be moved right and left and having a supporting part, said supporting part having a number of electronic pins selectively protruded by an electric signal therein and a magnetic body attached to a side thereof.

Reference will now be made in detail to preferred embodiments of the present invention, examples of which are illustrated in the accompanying drawings.

Figure 1:
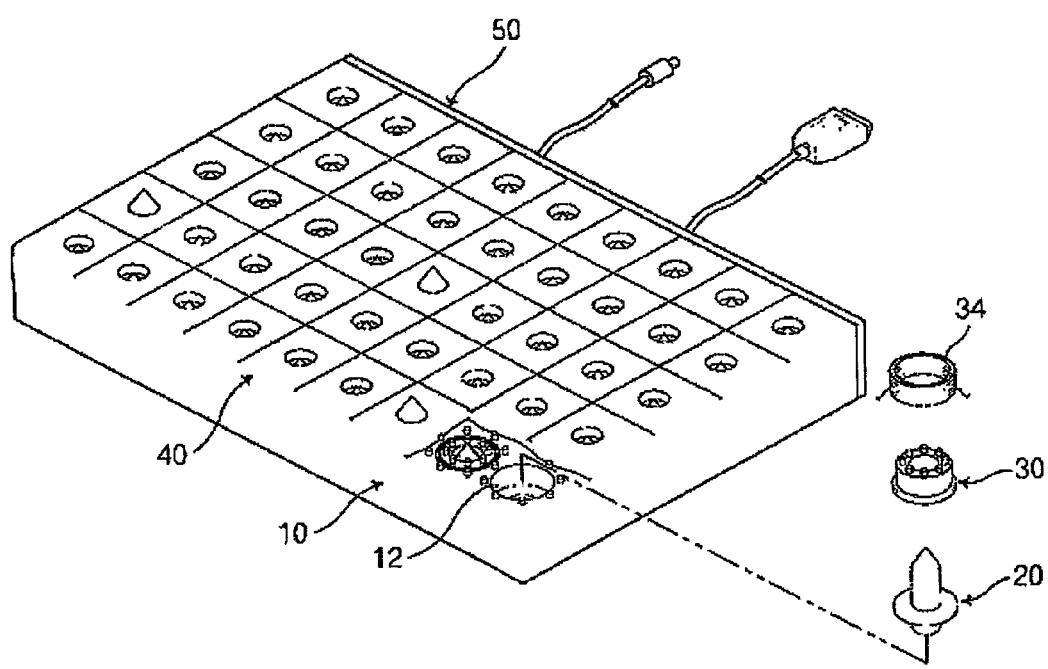
FIG. 1 is a schematic perspective view of conventional display device of braille points.
Figure 2:
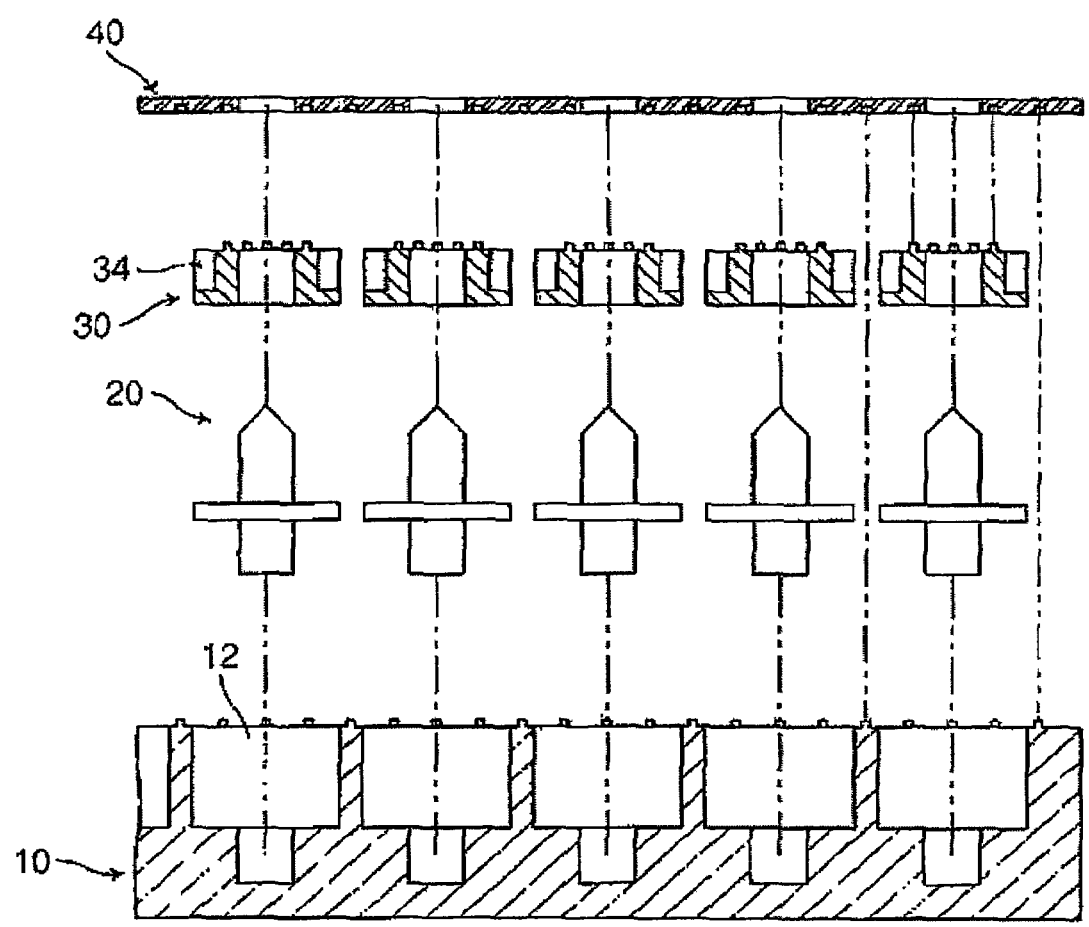
FIG. 2 is an exploded cross-sectional view of the display deice of braille points in FIG. 1.
Figure 3:
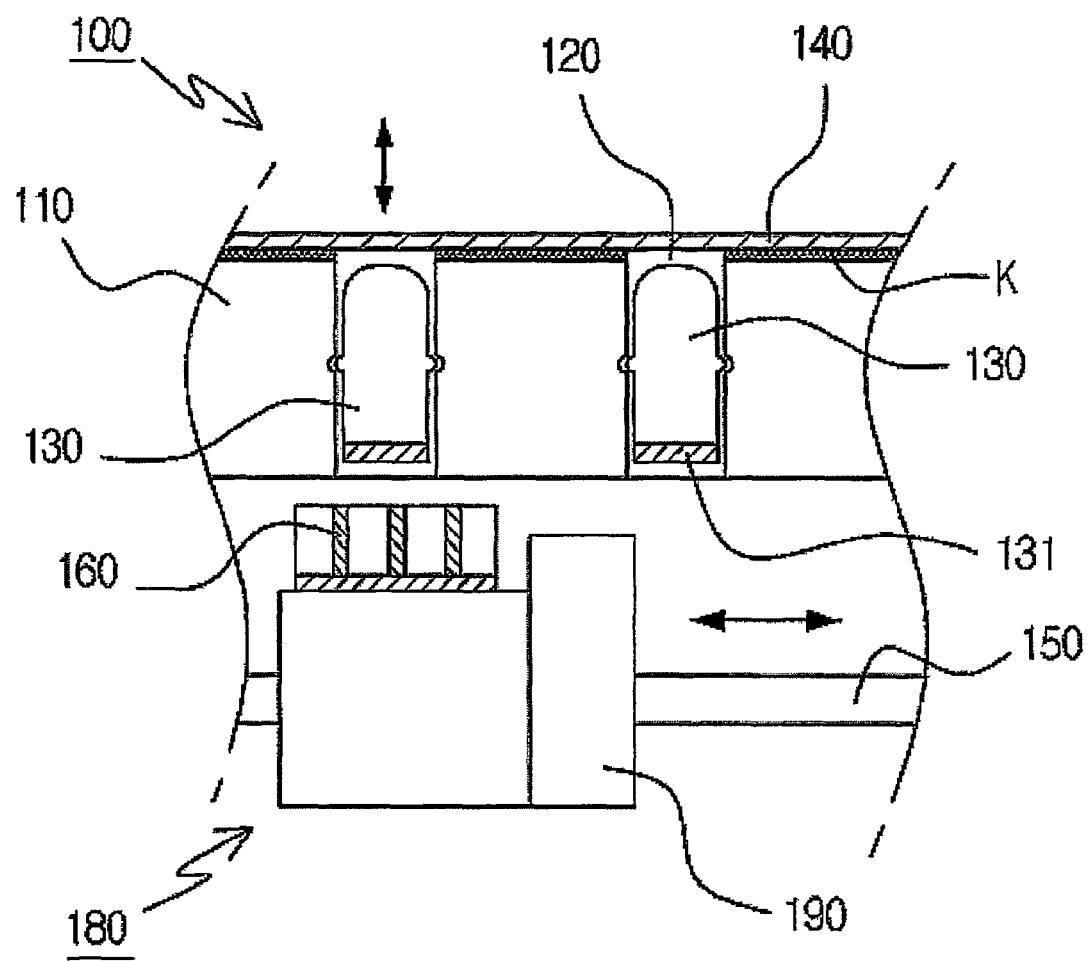
FIG. 3 is a view illustrating a schematic structure of a display device of braille points according to the present invention.
Figure 4:
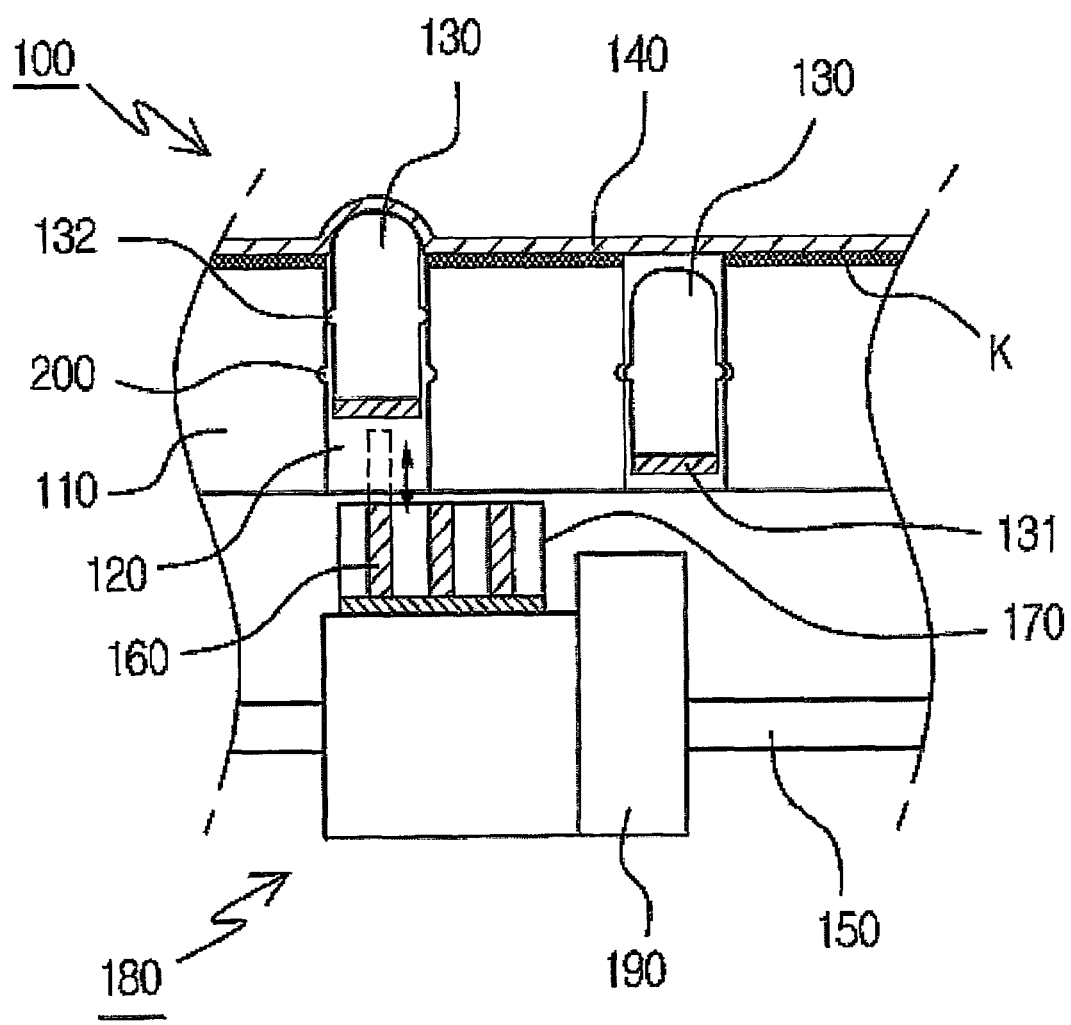
FIG. 4 is an exploded cross-sectional view of a display device of braille points according to the present invention.

FIG. 3 is a view illustrating a schematic structure of a display device of braille points according to the present invention and FIG. 4 is an exploded cross-sectional view of a display device of braille points according to the present invention. In the drawings, a number of receiving holes 120 are formed on the upper surface of a base part 110 of the display device 100 with a regular interval, and a number of recognition sticks 130 for the display device are installed respectively in the holes 120 to be moved upwardly and downwardly.

A coating layer 140 is formed on the upper surface having the receiving holes 120 therein by means of an adhesive K between the upper surface and the layer, and a metal plate 131 is mounted on the lower end of the stick 130 which is moved in the hole 120 upward and downward.

A ring 132 is formed on the circumference of the stick 130 and the stick 130 can be tightly installed in the receiving hole 120 of the base part 100.

A guide axis 150 is installed below the base part 100 having the holes 120 for receiving and moving up and down the sticks 130, and a header part 180 is installed on the guide axis 150 for moving right and left. The header part 180 has a supporting part 170 made of non-magnetic material and having an electronic pin 160 therein, and the electronic pin is selectively protruded by an electric signal. A magnetic body 190 is attached to a side of the supporting part 170 having the electric pin 160 therein to move a protruded stick 130 in the receiving hole 120 downwardly.

The reference number 200 is a recess formed on the inner surface of the receiving hole 120 in the base part 110. As the ring 132 is engaged with the recess, the stick 130 is prevented from being moved downward utterly by the magnetic body 190.

The operation and effect of the present invention is as follows.

Figure 5:
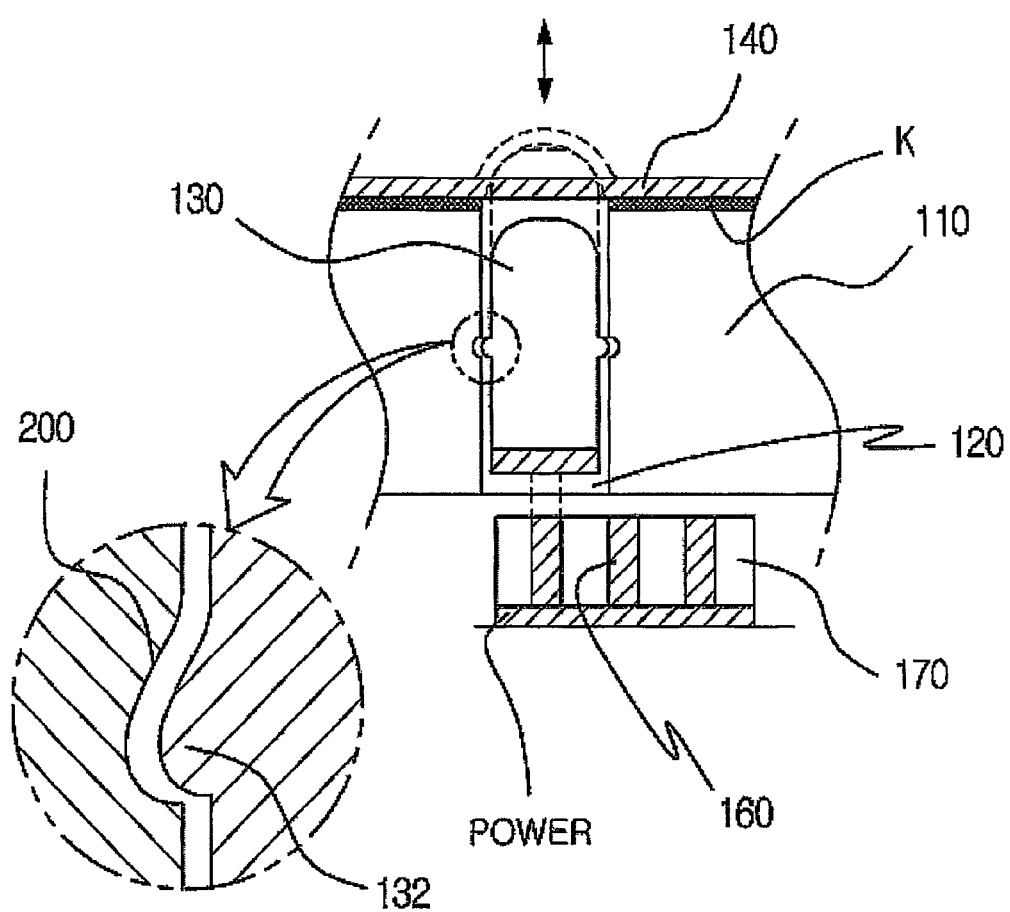
FIG. 5 is a view illustrating an operation of a recognition stick for braille points installed on a display device of braille points according to the present invention.

As shown in FIG. 3-FIG. 5, in a display device 100 in which a number of receiving holes 120 are formed on the upper surface of the base part 110 and a number of recognition sticks 130 are installed respectively in the holes 120 to be moved upwardly and downwardly, when the stick 130 is protruded to the upper surface to make a raised letters, the header 180 is moved right and left along the guide axis 150 installed below the base part 110 to raise the stick 130 selectively. Thus, the raised letters is formed by the stick 130 which is raised to the upper surface of the base part 110.

In the header 180 moved right and left along the guide axis 150 installed below the base part 110, as the electronic pin 160 is installed in the supporting part 170 to be selectively protruded(raised) by a predetermined electric signal for making the raised letters, the electric pin 160 pulls up the stick 130 in the receiving hole 120.

As the ring 132 is made of a rubber and formed on the circumference of the stick 130, the stick 130 is tightly inserted in the hole 120 of the base part 130 and is not moved down by the gravity during moved in the holes 120.

As a number of pins 160 capable of moving up and down the stick 130 are installed in the supporting part 170 of the header 180 to be selectively protruded by an electric signal and the electric body 190 is attached to the side of the supporting part 170, the raised stick 130 in the hole 120 can be moved down by the magnetic body 190.

That is, as the metal plate 131 is mounted on the lower end of the stick 130 which can be moved in the hole 120 upwardly and downwardly, the electronic pin 160 of the header 180 forms the raised letters while the magnetic body 190 on the side of the supporting part 170 pulls down the stick 130 protruded before for forming the raised letters.

As the recess 200 is formed on the inner surface of the receiving hole 120 in the base part 110, when the stick 130 is moved down by the metal plate and the magnetic body 190, the rubber ring 132 formed on the stick 130 is entered and fixed in the recess 220. Therefore, the stick 130 can be not moved down anymore. In the recess 200, as the upper part of the recess is curved slightly and the lower part of the recess is curved rapidly, the ring 132 can easily enters or leaves the recess from or to the upper direction and can not proceeds beyond the lower part.

For the moving and fixing of the stick 130, the lower part of the recess can be stepped or made as various shapes.

Meanwhile, as the coating layer 140 is formed on the upper surface having the receiving holes 120 therein by means of the adhesive K between the upper surface and the layer, an excess protruding of the stick 130 is prevented and a alien material such as dust and moisture is prevented from being entered in the hole 120.

In the case that digital braille information is recorded on a cassette player or a CD player by using the stick 130, an inherent frequency is first assigned to each of 3 point numbers of one column of braille which is comprised of six points formed on the upper surface of the base part 110 by using the receiving hole 120 and the stick 130 and a frequency signal corresponding to each of the point numbers is continuously recorded as a frame on the tape or CD. At this time, each time a column data is completed, a frame pulse is recorded on the same track or an adjacent track.

Therefore, when playing the cassette player or CD player, the cassette player and the CD player read out a column or two columns of data from the digital braille data recorded on the tape or CD per every frame pulse and determine the inherent frequency. Next, information for existence and nonexistence of the inherent frequency about each point number is latched as next frame pulse signal input. Then, by driving a pertinent pin 160 in the header 180 by using the latched data, the stick 130 installed in the hole 120 is protruded to form six-point type braille.

INDUSTRIAL APPLICABILITY

In the display device of braille points according to the present invention, as a number of recognition sticks are respectively installed in the receiving holes to be moved upwardly and downwardly, the header having a number of electronic pins is installed on the guide axis below the receiving hole and the stick is selectively protruded, character information can be easily transformed to braille points which is sensed by the tactile of a blind person. In addition, as the fabrication and installation is performed easily, malfunction of the stick can be prevented beforehand.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A display device of braille points in which a number of receiving holes (120) are formed on the upper surface of a base part (110) with a regular interval, a number of recognition sticks (130) for the display device are installed respectively in the holes (120) to be moved upwardly and downwardly, said stick (130) being selectively protruded in the hole (120) of the base part (100), comprising:

a base pan (100) in which a number of receiving holes (120) are formed on the upper surface and a coating layer (140) is formed on the upper surface;

a number of recognition sticks (130) installed respectively in the holes (120) to be moved upwardly and downwardly and having a metal plate (131) attached to the lower end of the stick;

a guide axis (150) is installed below the base pan (110) having the holes (120) to move the stick upwardly and downwardly, and a header part (180) installed on the guide axis (150) to be moved right and left and having a supporting part (170), said supporting part (170) having a number of electronic pins (160) selectively protruded by an electric signal therein and a magnetic body (190) attached to a side thereof.

2. The display device of braille points as claimed in claim 1, wherein the supporting part (170) installed on the header part (180) and having the electronic pin (160) protruded by the electric signal is made of non-magnetic material.

3. The display device of braille points as claimed in claim 1, wherein a recess (200) is formed on the inner surface of the receiving hole (120) of the base part (110), and a ring (132) formed on the stick (130) is engaged with the recess to prevent the stick from being pulled down entirely by the magnetic body (190).

4. The display device of braille points as claimed in claim 3, wherein the upper part of the recess (200) is curved slightly, the lower part of the recess is curved rapidly and the ring (132) easily enters or leaves the recess from or to the upper direction.

5. The display device of braille points as claimed in claim 1, wherein an inherent frequency is assigned to each of 3 point numbers of one column of braille which is comprised of six points formed on the upper surface of the base part (110) by using the receiving hole (120) and the stick (130), a frequency signal corresponding to each of the point numbers is continuously recorded as a frame on a cassette tape, each time a column data is completed a frame pulse is recorded on a track of the tape, and a pertinent pin (160) in the header (180) is driven in case of playing the cassette.

* * * * *